(12) United States Patent
Berdelle-Hilge

(10) Patent No.: US 10,000,346 B2
(45) Date of Patent: Jun. 19, 2018

(54) TRANSPORTING ELEMENT FOR A DISTRIBUTING CONVEYOR OF A SORTER OF A SORTING INSTALLATION

(71) Applicant: SIEMENS AKTIENGESELLSCHAFT, Munich (DE)

(72) Inventor: Peter Berdelle-Hilge, Konstanz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days. days.

(21) Appl. No.: 15/302,003

(22) PCT Filed: Mar. 23, 2015

(86) PCT No.: PCT/EP2015/056084
§ 371 (c)(1),
(2) Date: Oct. 5, 2016

(87) PCT Pub. No.: WO2015/154976
PCT Pub. Date: Oct. 15, 2015

(65) Prior Publication Data
US 2017/0121127 A1 May 4, 2017

(30) Foreign Application Priority Data

Apr. 8, 2014 (DE) ........................ 10 2014 206 740

(51) Int. Cl.
*B65G 47/40* (2006.01)
*B65G 47/96* (2006.01)

(52) U.S. Cl.
CPC .......... *B65G 47/965* (2013.01); *B65G 47/40* (2013.01)

(58) Field of Classification Search
CPC ..... B65G 47/965; B65G 47/962; B65G 47/40
See application file for complete search history.

(56) References Cited

U.S. PATENT DOCUMENTS

| 2,969,137 A | 1/1961 | Baumann et al. |
| 3,848,728 A | 11/1974 | Leibrick et al. |

(Continued)

FOREIGN PATENT DOCUMENTS

| DE | 69114832 T2 | 5/1996 |
| DE | 4447396 C1 | 6/1996 |

(Continued)

*Primary Examiner* — Mark A Deuble
(74) *Attorney, Agent, or Firm* — Laurence Greenberg; Werner Stemer; Ralph Locher

(57) ABSTRACT

A transport element for a distributing conveyor of a sorter of a sorting installation of a sorting system for sorting articles includes at least one first transport surface, which can be pivoted on both sides about an axis ("tilting axis") in a transport direction of the transport element and is intended for accommodating at least one article which is to be sorted, and at least one second transport surface, which is inclined about an axis ("axis of inclination") in the transport direction of the transport element and is intended for accommodating at least one article which is to be sorted. The at least one first transport surface, which can be pivoted on either side, is disposed above the at least one second, inclined transport surface. A distributing conveyor having a plurality of transport elements is also provided.

10 Claims, 7 Drawing Sheets

(56) References Cited

U.S. PATENT DOCUMENTS

| | | | |
|---|---|---|---|
| 5,353,912 A | 10/1994 | Killer et al. | |
| 5,489,017 A | 2/1996 | Bonnet | |
| 5,662,206 A | 9/1997 | Baum et al. | |
| 5,878,863 A * | 3/1999 | Madden | B65G 47/965 198/370.04 |
| 6,082,522 A * | 7/2000 | Polling | B65G 47/962 198/370.04 |
| 6,234,297 B1 * | 5/2001 | Blanc | B65G 47/965 198/370.04 |
| 6,460,681 B1 | 10/2002 | Coutant et al. | |
| 2016/0137429 A1 * | 5/2016 | Berdelle-Hilge | B65G 47/962 198/370.04 |

FOREIGN PATENT DOCUMENTS

| | | |
|---|---|---|
| DE | 102013212745 A1 | 12/2014 |
| EP | 0556159 A2 | 8/1993 |
| FR | 2885123 A1 | 11/2006 |
| JP | S4862775 U | 8/1973 |
| WO | 9523750 A1 | 9/1995 |
| WO | 9534492 A2 | 12/1995 |

\* cited by examiner

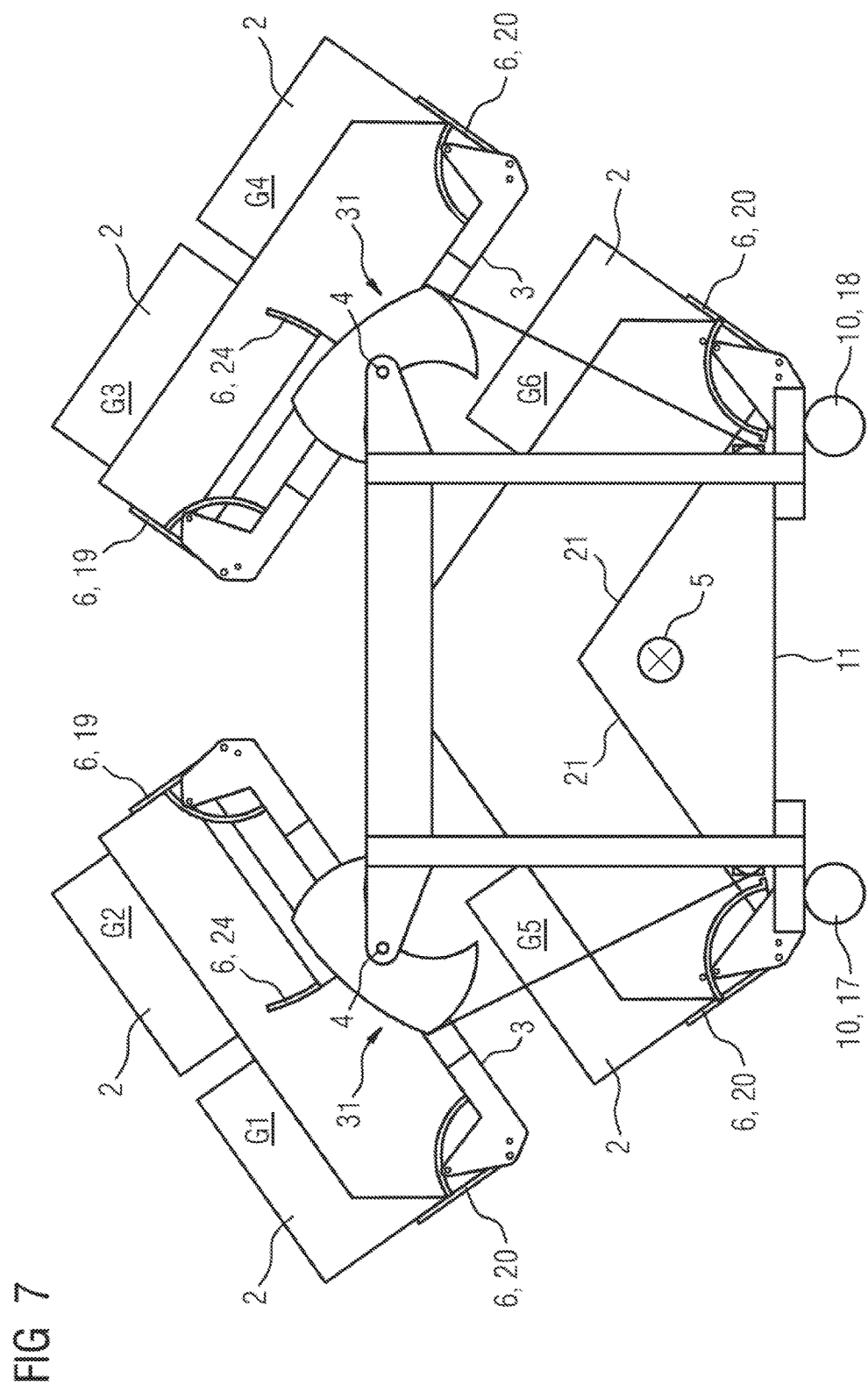

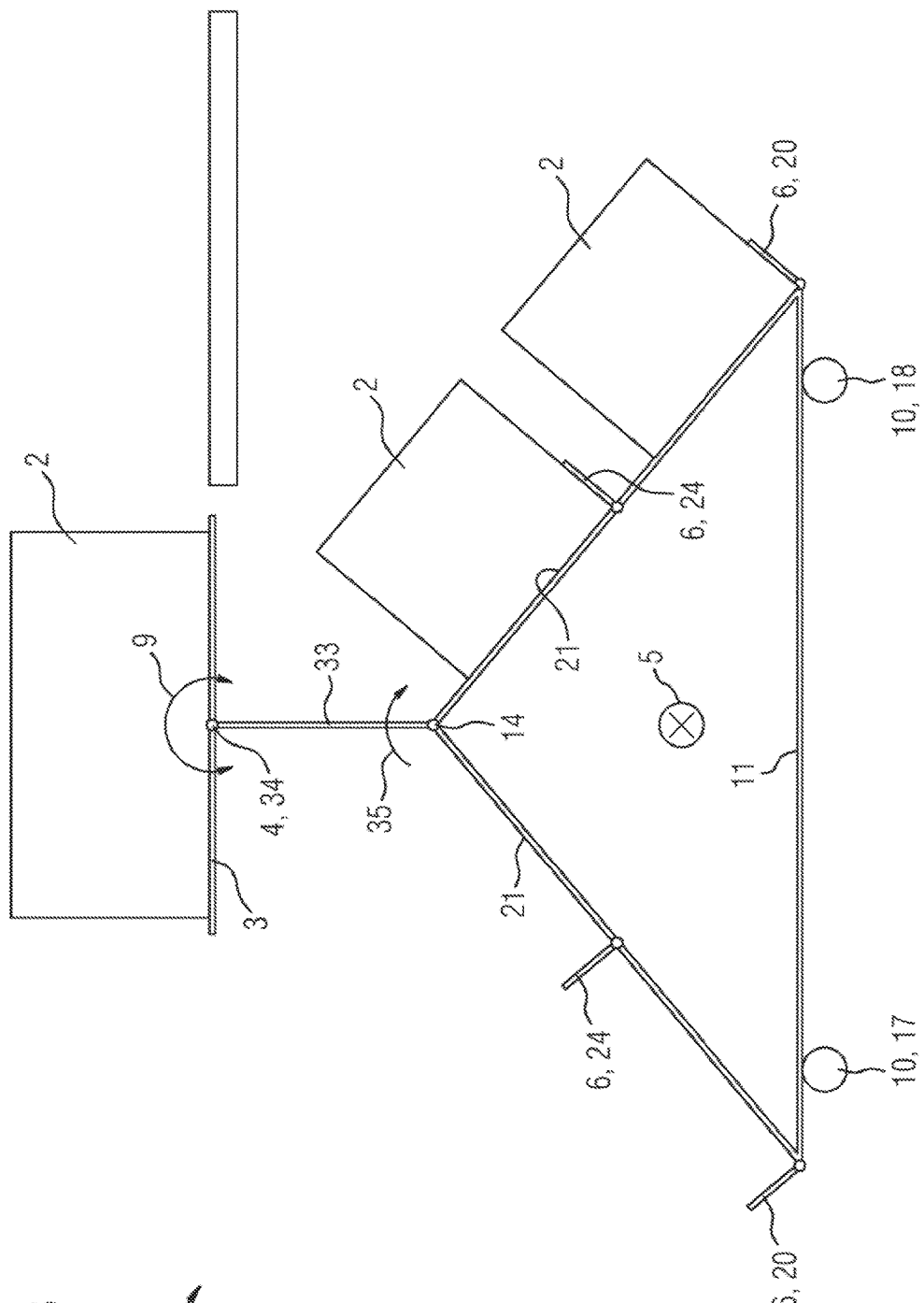

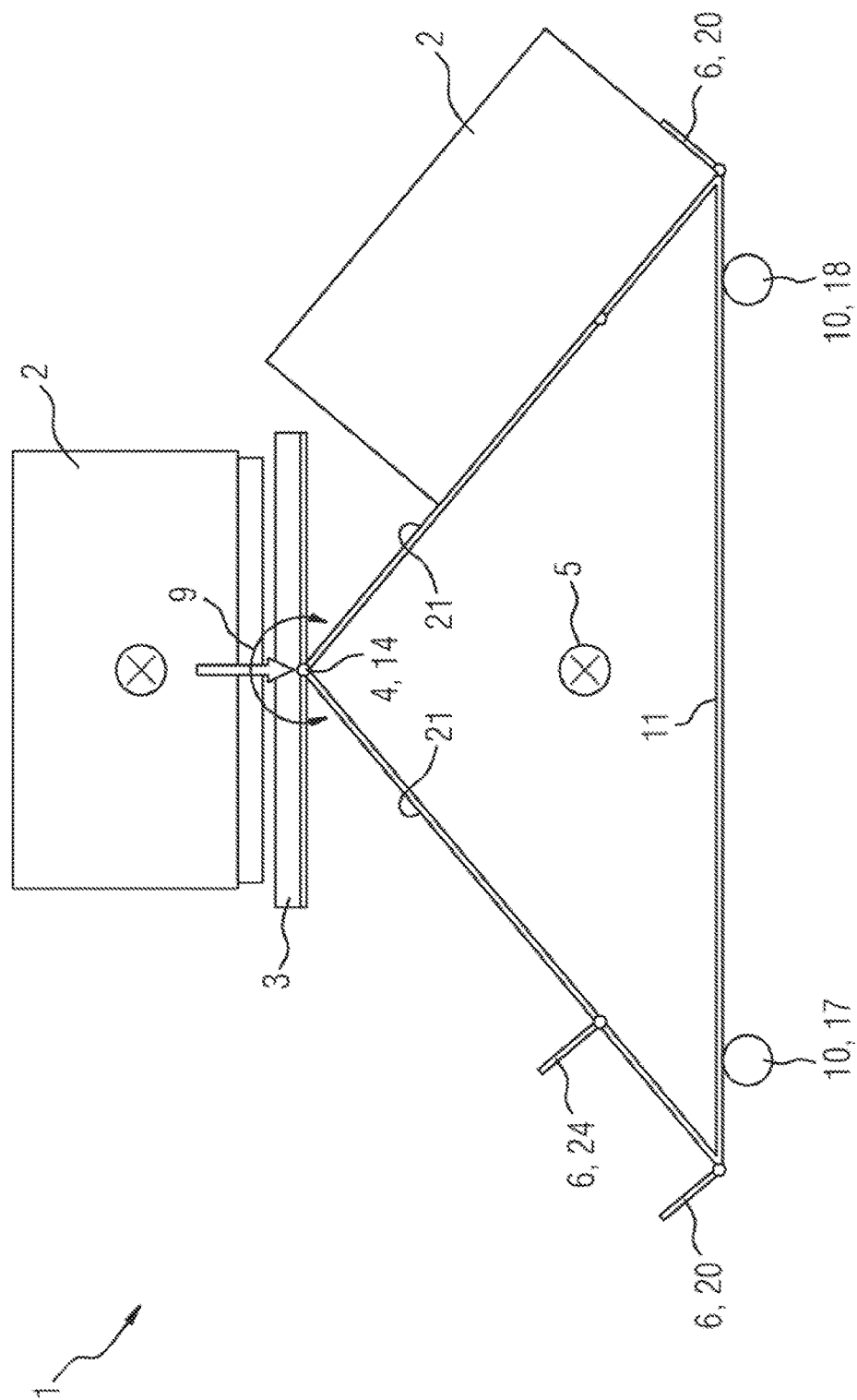

TRANSPORTING ELEMENT FOR A DISTRIBUTING CONVEYOR OF A SORTER OF A SORTING INSTALLATION

BACKGROUND OF THE INVENTION

Field of the Invention

The invention relates to a transport element for a distributing conveyor of a sorter of a sorting installation of a sorting system.

Sorting systems identify articles that arrive in a random sequence, for example packages (in mail centers), baggage (in airports) or consignments (in mail order centers), based on predefined differentiating criteria and distribute them to specified destinations.

Such sorting systems consist of sorting installations, which ensure the system functionality of the sorting systems with corresponding organizational processes and tailored operating strategies that are implemented in associated controllers in the sorting installations or sorting systems.

The sorting installation here is the technical part of the sorting system and consists of one or more sorters, which bring(s) about the distribution of the articles to the destinations, as well as functional areas before and after these, for example units conveying the articles in and away.

Such a sorter itself consists of an inward feed, a distributing conveyor and end/destination points for the articles to be distributed.

Depending on article weight, sorters achieve sorting outputs of up to above 15,000 articles/hour. Standard maximum weights of articles are around approx. 20 kg to 60 kg but can also be up to 150 kg for individual sorting systems.

Sorters connected in a parallel manner or in a matrix in sorting installations also allow sorting systems to achieve sorting outputs of up to above 200,000 articles/hour.

Increasing and/or changing demands on sorting systems, in particular high sorting outputs and/or different articles, are met by diverse distributing conveyor models.

When classifying distributing conveyors by technology based on the criteria of type of articles conveyed, active principle of an outward feed for the articles and conveying principle, it is possible to differentiate in particular between distributing conveyors with a crossbelt technology and a tilt tray technology, referred to in short as crossbelt conveyors and tilt tray conveyors.

A crossbelt conveyor is known from http://de.wikipedia.org/wiki/Quergurtsorter (available on Apr. 3, 2014).

A conveying means in the crossbelt conveyor consists of individual transport elements, in this instance carts, connected in an articulated manner to form a closed chain, which are moved by way of a guide system—along a route or in a transport direction/conveying direction defined thereby—at speeds of up to 3.5 m/s.

The route is spatially defined, usually horizontal.

The cart chain or transport element chain is generally driven by way of chain drives, friction wheel drives and increasingly by way of linear motor drives.

Belt conveyors installed orthogonally to the transport/conveying direction are present on the carts or transport elements as article holders and outward feed mechanisms.

The articles lying on belts of the belt conveyor can thus be conveyed actively to the end point (outward feed) on both sides at the outward feed position.

A drive energy of the belts is transmitted mechanically or electrically by way of collector wires and increasingly contactlessly.

A tilt tray conveyor is known from http://de.wikipedia.org/wiki/Kippschalensorter (available on Apr. 3, 2014).

The conveying means in the tilt tray conveyor is largely identical to that of the crossbelt conveyor and also consists of the individual transport elements or carts connected in an articulated manner to form a closed chain, which here too are moved—by way of the guide system—along the route or in the transport direction/conveying direction defined thereby.

In tilt tray conveyors mechanically or electrically tiltable transport surfaces, in this instance what are referred to as (support) trays in the form of largely flat support plates without edges are installed on the carts/transport elements as article holders and outward feed mechanisms.

The (support) tray/plate is then tilted from its generally horizontal position (the horizontal) or basic position or conveying position parallel to the route ("upright basic position") to an inclined tilt position ("lateral tilt/inclination about an axis in the conveying direction") at the respective destination or outward feed point, triggering/bringing about lateral sliding/slipping of the article to be sorted out of the support tray or from its tilted support tray/plate surface at the intended destination point due to the application of a downhill force due to gravity on the article to be sorted by the lateral tilt/inclination (outward feed).

Then, in other words after the article to be sorted has been fed out of the relevant cart/transport element or after the relevant cart/transport element has passed the destination point, the tilted support tray is returned to its horizontal conveying position/upright basic position or the horizontal.

The tilt movement is two-dimensional or three-dimensional. A tilt kinematic influences a movement path of the article as it slides off and as a result the minimum end point width.

The line throughput of sorting installations is a significant parameter (for sorting output) for the topological complexity of the sorting system as a whole. It is therefore desirable to increase line throughput—to increase sorting output.

Higher line throughput can be achieved for example by populating the conveying means more densely with articles to be sorted.

This can be done by packing the articles more densely in a longitudinal direction and by holding more articles in the transverse direction.

However technical implementation for this purpose is difficult, technically complex and cost-intensive, particularly with distributing conveyors such as crossbelt and tilt tray conveyors.

It is therefore also known, in addition to the simple arrangement with crossbelt conveyors, also to install two crossbelt conveyors one above the other (double stack crossbelt conveyor) or next to one another (parallel cross belt conveyor) on a cart/transport element in order to increase the line throughput and sorting output in this manner. Corresponding double and parallel systems are also known for tilt tray conveyors, it being possible to increase the line throughput and sorting output in this manner there too.

The technical solution of such double or parallel systems with crossbelt and tilt tray conveyors is elaborate, generally requiring the conveying of electrical actuators on each transport element/cart, as well as being complex and/or cost-intensive.

BRIEF SUMMARY OF THE INVENTION

It is the object of the invention to rectify the disadvantages in the prior art, in particular to provide sorting installations with sorters or distributing conveyors, which allow an increased line throughput and an increased sorting output to be achieved for articles to be sorted.

It is also the object of the invention to provide a distributing conveyor of a sorter in a sorting installation of a sorting system, which can be implemented simply and cost-effectively and which allows reliable outward feeding of articles from the conveying means of the distributing conveyor.

The object is achieved by a transport element for a distributing conveyor of a sorter of a sorting installation of a sorting system with the features set out in the independent claim.

This transport element has at least one first transport surface that can be pivoted (or tilted) on both sides about an axis ("tilt axis") in a transport direction of the transport element for holding at least one article to be sorted, for example a mail article, such as a letter and/or a package, an item of baggage or a consignment.

When the inventive at least one first transport surface that can be pivoted (or tilted) on both sides is in a tilted position (for example during unloading/loading and during transportation), an article arranged (during transportation) or to be arranged (during unloading/loading) on the at least one first transport surface that can be pivoted on both sides is subject to a "constant" or "perpetual" downhill force due to gravity or weight force, which could bring about or trigger or does trigger a related movement, for example the sliding down of the article arranged on the at least one first transport surface that can be pivoted on both sides.

Said transport element also has at least one second transport surface inclined about an axis ("axis of inclination") in the transport direction of the transport element for holding at least one article to be sorted.

When the inventive at least one second, inclined transport surface is inclined in such a manner, an article arranged on the at least one second, inclined transport surface is subject to a "constant" or "perpetual" downhill force due to gravity or weight force, which could bring about or trigger a related movement, for example the sliding down of the article arranged on the at least one second transport surface (see also at least one first transport surface that can be pivoted on both sides in the tilted position).

The at least one first transport surface that can be pivoted on both sides is arranged above the at least one second pivoted transport surface here.

Being able to be pivoted on both sides (for the at least one first transport surface that can be pivoted on both sides) here means that it can be pivoted/tilted (rocker) from a horizontal position (the horizontal) in two opposing pivot directions about the horizontal position (the horizontal), for example by means of a manipulation apparatus, such as an actuator, for example by means of an electromechanical drive.

The two opposing pivot directions can mean that the corresponding two pivot direction vectors (which define two pivot directions mathematically in space) are aligned counter to one another.

(In other words or) graphically speaking the two pivot axes, about which the at least one first transport surface that can be pivoted on both sides can be pivoted/tilted counter to one another (in opposing directions) in both pivot directions, either correspond (a common pivot axis for both pivot directions) or are (at least) parallel to one another (one pivot axis for each pivot direction, with both pivot axes being (then at least) parallel to one another).

Inclined (for the at least one second, inclined transport surface) can also mean that the at least one second, inclined transport surface is set statically at a predefinable angle of inclination (static transport surface). Regardless of this, the inclination of at least one second, inclined transport surface can be adjusted, for example by means of a manipulation apparatus/actuator, such as an electromechanical drive.

Arranged above (for the at least one first transport surface that can be pivoted on both sides and the at least one second, inclined transport surface) means that the at least one first transport surface that can be pivoted on both sides is above the at least one second, inclined transport surface at least when the former is in the horizontal position.

In (simple or) graphic terms, when the at least one first transport surface that can be pivoted on both sides is in the horizontal position, the (vertically) highest point of the at least one second, inclined transport surface is below (or at least at the same (vertical) height as) the at least one first transport surface that can be pivoted on both sides.

Such an arrangement provided for this purpose of the at least one first transport surface that can be pivoted on both sides (as a transport surface that can be pivoted on both sides) and the at least one second, inclined transport surface (as an (at least) inclined transport surface) or the at least one first transport surface that can be pivoted on both sides (above) in relation to the at least one second, inclined transport surface allow(s)

on the one hand the influence of gravity—depending on the tilt position of the at least one first transport surface that can be pivoted on both sides on a transported article to be transported there to trigger a movement in two different directions, with the result that manipulation/movement of the transported article/article to be sorted can always be performed with an assisting/positive influence of gravity during loading and unloading, and on the other hand (and in combination therewith)

as the at least one first transport surface that can be pivoted on both sides is arranged above the at least one second, inclined transport surface—such manipulation/movement triggered by gravity can be used for an interplay/interaction of the at least one first transport surface that can be pivoted on both sides with the at least one second, inclined transport surface, in particular to transfer an article to be transported from the at least one first transport surface that can be pivoted on both sides to the at least one second, inclined transport surface.

In (simple or) graphic terms the fact that the at least one first transport surface that can be pivoted on both sides can be pivoted on both sides as well as or in combination with its arrangement ("above") in relation to the at least one second (at least also) inclined transport surface (and the resulting possibility of positioning/aligning the two transport surfaces in relation to one another) allows "gravity-assisted" parallel loading/unloading (in almost any manner) on both sides of articles being transported (without any negative influence of gravity, in other words without any gravity component acting counter to the loading/unloading direction) with the (or from a (single)) transport element and (almost any) (internal)—optionally also multiple—repositioning/reloading (also presorting) of loaded transported articles with the transport element.

This allows the transport surfaces to be used "optimally" or efficiently for loading with articles and loading and/or unloading operations and transport operations to be performed in an "optimized" or efficient manner (and thus the overall "installation design" to be configured in an "optimized" or efficient manner).

The line throughput and sorting output of the distributing conveyor or sorter with such a transport element is increased; at the same time throughput-related line costs are significantly reduced; the transport element—and thus the distributing conveyor or sorter—can also be implemented in a simple and cost-effective manner, thereby also allowing reliable outward feeding of articles from the conveying means of the distributing conveyor.

When the at least one first transport surface that can be pivoted on both sides is also arranged above the at least one second, inclined transport surface, it being possible to unload and load at the upper level and (just) to unload at the lower level, the associated displacement of loading/a loading function "upward" allows the required surface of a sorting installation to be reduced. It is thus also possible to load at the top and unload at the bottom at the same time or unload at the top and bottom at the same time.

The transport element, in particular due to its at least one first transport surface that can be pivoted on both sides, and the ability to change loading side there, demonstrates very little dependence on an unbalanced load, which reduces the kinematic influence on the transport element. This increases the flexibility of use of the transport element and the sorter/distributing conveyor.

Tilting the at least one first transport surface that can be pivoted on both sides before unloading can reduce the breakaway force of the transported articles on their transport surface, allowing them to be unloaded (with a positive influence of gravity or without a negative influence of gravity) simply, reliably and an a manner that can be controlled specifically.

Such a transport element or the transport elements can also be used in/with current loading stations for crossbelt sorters.

Unloading acceleration and unloading speed can also be higher with the transport element than with current crossbelt sorters.

A common sorting platform can also be implemented for use with different article spectra, optionally including baggage, in or with the transport element.

Because of its configuration the transport element can also be loaded in the unloading region of a distributing conveyor or the installation. The required proportional increase in the number of loading points associated with an increase in throughput therefore does not necessarily mean the installation has to be enlarged. The loading points can be distributed over the entire route. This allows a further, in this instance topographically justified, throughput increase (by factor 2 maximum).

The high throughput potential—that can be achieved with the transport element—means that the throughput achieved with the distributing conveyor or the installation can be selected to be smaller than the maximum possible, in order to be able to reduce other (critical) system parameters (of the transport element or in the distributing conveyor/installation), e.g. the reduction of the transport speed of the transport element, which also means lower energy consumption, wear, noise and better ejection behavior for the transport element.

Preferred developments of the invention will also emerge from the dependent claims and/or the descriptions which follow. In particular developments relating to the at least one first transport surface that can be pivoted on both sides or the at least one second, inclined transport surface can also relate to the respective other transport surface (i.e. at least second, inclined or at least first that can be pivoted on both sides).

Developments of the at least one first transport surface that can be pivoted on both sides.

Provision can preferably be made for an achievable (maximum) tilt angle (on both sides) (about the horizontal) for the at least one first transport surface that can be pivoted on both sides to be in the region of approx. +/−60°, particularly preferably in the region of approx. +/−45°. The achievable (maximum) tilt angle (on both sides) of the at least one first transport surface that can be pivoted on both sides can also be tailored to an angle of inclination of the at least one second, inclined transport surface or be selected as a function thereof.

The tilt movement of the at least one first transport surface that can be pivoted on both sides can preferably be brought about by means of a corresponding manipulation apparatus or a corresponding actuator, such as an electromechanical drive.

Provision can also be made for the at least one first transport surface that can be pivoted on both sides to be able to be positioned by pivoting to a pivot position in relation to the at least one second, inclined transport surface such that an article to be transported can be transferred from the at least one first transport surface that can be pivoted on both sides—at least subject to the influence of gravity—to the at least one second, pivoted transport surface.

"Can be transferred" here can mean that (by/with corresponding positioning of the at least one first transport surface that can be pivoted on both sides in relation to the at least one second, inclined transport surface (angle, alignment, positioning)) the article to be transported moves from the at least one first transport surface that can be pivoted on both sides to/onto the at least one second, inclined transport surface subject to the influence of gravity, in particular without additional "external manipulation" by an actuator, for example in that the article to be transported slides down from the at least one first transport surface that can be pivoted on both sides to the at least one second, inclined transport surface.

To this end, i.e. for the transfer, the tilt angle of the at least one first transport surface that can be pivoted on both sides for example can be approximately identical to or steeper than the angle of inclination of the at least second, inclined transport surface. The at least first transport surface that can be pivoted on both sides and the at least second, inclined transport surface can also be aligned and/or positioned in relation to one another such that their surfaces are approximately extensions of one another.

To assist such a transfer of articles between the at least one first transport surface that can be pivoted on both sides and the at least one second, inclined transport surface however the assistance of (active and/or passive) actuators can be provided, such as conveying means, on the at least one first transport surface that can be pivoted on both sides and/or on the at least one second, inclined transport surface.

The at least one first transport surface that can be pivoted on both sides can also have at least one retaining apparatus, by means of which an article to be sorted that is held on the transport surface that can be pivoted on both sides (or which is in a pivoted/tilted position) can be retained to prevent it sliding down—due to tilt, due to or with the assistance of gravity or due to a downhill force—on the tilted at least one first transport surface that can be pivoted on both sides.

Such a retaining apparatus can for example be a retaining element which uses a form and/or force and/or friction lock with the article to be sorted which is sliding down the tilted, at least one first transport surface that can be pivoted on both sides to retain it and prevent it sliding down.

In simple terms the at least one retaining apparatus ensures a retaining function, for example by means of the form and/or force and/or friction lock, for the article to be sorted which is sliding down the tilted, at least one first transport surface that can be pivoted on both sides to retain it and prevent it sliding down.

The at least one retaining apparatus, for example the retaining element, can also be manipulated, for example can be switched, displaced and/or lowered, in such a manner that the article to be sorted that is held on the at least one first transport surface that can be pivoted on both sides can be released to slide—due to tilt, gravity or downhill force—down the tilted at least one first transport surface that can be pivoted on both sides.

The at least one retaining apparatus can also be a pneumatic or electrostatic retaining element, by means of which corresponding actuation/"manipulation" can cause normal forces on the article to be generated or reduced in such a manner that the article to be sorted that is held on the at least one first transport surface that can be pivoted on both sides can be released to slide—due to tilt, gravity or downhill force—down the tilted at least one first transport surface that can be pivoted on both sides.

The article to be sorted that is held on the transport surface can thus start to slide down the tilted at least one first transport surface that can be pivoted on both sides; the outward feeding of the article to be sorted from the transport element can be initiated or triggered in a temporally and/or spatially specific and desired manner.

In graphic and simple terms during manipulation of the at least one retaining apparatus its retaining function is canceled, for example by releasing the form and/or force lock, and the article to be sorted that is held on the at least one first transport surface that can be pivoted on both sides is therefore released to slide—due to tilt, gravity or downhill force—down the tilted at least one first transport surface that can be pivoted on both sides.

Correspondingly the at least one retaining apparatus, for example the retaining element, can also be manipulated, for example can be switched, displaced and/or lowered, in such a manner that an article to be sorted (load) that is to be held on the at least one first transport surface that can be pivoted on both sides can be loaded unimpeded—by the retaining apparatus—in particular can "slide" unimpeded (with corresponding tilting of the at least one first transport surface that can be pivoted on both sides subject to the positive influence of gravity).

Such a manipulatable retaining apparatus or retaining element can be for example a switchable/foldable/collapsible flap.

It is particularly preferable for such a manipulatable retaining apparatus to have a lowerable bar, a lowerable flap, a hatch or the like, as such a retaining element does not require an "encroaching" movement region.

In particular such a manipulatable retaining apparatus or retaining element can extend parallel to the tilt axis on the at least one first transport surface that can be pivoted on both sides ("horizontal alignment"). It can also extend over the entire relevant ("horizontal") extension of the at least one first transport surface that can be pivoted on both sides ("horizontally over the entire transport surface width"), allowing a number of, in particular small, articles to be transported and fed outward at the same time on the at least one first transport surface that can be pivoted on both sides.

Such a manipulatable, at least one retaining apparatus or retaining element can also be configured as elastic (at least in the outward feed direction) in order to reduce the strain on an article to be sorted (avoiding "hard" impact forces).

The manipulation of such a manipulatable, at least one retaining apparatus or retaining element can be activated by the use of a motor and a corresponding number of friction couplings for a force transfer with individual control elements.

Provision can also be made for the at least one first transport surface that can be pivoted on both sides to have a number of the manipulatable at least one retaining apparatuses/elements. Corresponding positioning can result from the nature and/or size of the articles to be transported and the transport element or the at least one first transport surface that can be pivoted on both sides.

The at least one first transport surface that can be pivoted on both sides preferably has at least three manipulatable retaining apparatuses/elements, two of which are located on the two lateral edges (i.e. at the edge facing the unloading/loading side and at the opposing edge) of the at least one first transport surface that can be pivoted on both sides ("edge retaining element" or "outer retaining element" (at the edge facing the unloading/loading side) and inner retaining element (at the opposing edge); the third manipulatable retaining apparatus/element can be arranged approximately in the center of the at least one first transport surface that can be pivoted on both sides ("center retaining element"). The center retaining element here is particularly preferably embodied as a lowerable bar, with the edge retaining elements each being embodied as pivotable flaps.

One cheek or lateral cheeks (i.e. facing/counter to the transport direction) on the at least one first transport surface that can be pivoted on both sides allow/s articles with no inherent rigidity also to be transported and/or unloaded in a reliable manner.

A common tilt axis (for both pivot directions) can also be provided when implementing the tilt movement on both sides of the at least one first transport surface that can be pivoted on both sides. This common tilt axis can be positioned such that the at least one first transport surface that can be pivoted on both sides is divided into two sub-surfaces of approximately equal size (center axis).

Provision can also be made for the tilt axis or tilt axes not to be fixed but to move during the pivot/tilt movement, as can be brought about by means of a corresponding mechanical system (instantaneous centrode).

To increase the efficiency of the transport element or the line throughput with the transport element or distributing conveyor/sorter, two such "at least" one first transport surfaces that can be pivoted on both sides can be provided. These two first transport surfaces that can be pivoted on both sides can particularly preferably be arranged next to one another in the transport direction with the transport element.

A particularly simple, efficient and cost-effective arrangement of the two first transport surfaces that can be pivoted on both sides with the transport element results if they are arranged symmetrically next to one another (with the transport element) at roughly the same (vertical) height (and thus both above the at least one second, inclined transport surface).

The at least one first transport surface that can be pivoted on both sides and/or the at least one second, inclined transport surface here can (each) be configured in sub-regions or largely flat or planar or as a free surface.

Developments of the at least one second, inclined transport surface.

The at least one second, inclined transport surface can also be at an angle to the vertical or to a normal in relation to a route plane of the transport element of approx. 30° to 75°, in particular approx. 60° to 70°, specifically also approx. 65°.

The at least one second, inclined transport surface can also have at least one retaining apparatus (see also corresponding retaining apparatuses on the at least one first transport surface that can be pivoted on both sides) by means of which an article to be sorted that is held on the at least one second, inclined transport surface can be retained to prevent it sliding down—due to inclination, gravity or downhill force—thereon.

Such a retaining apparatus can thus be a retaining element which in particular uses a form and/or force lock with the article to be sorted which is sliding down the at least one second, inclined transport surface to retain it and prevent it sliding down.

In simple terms the at least one retaining apparatus ensures a retaining function, for example by means of the form and/or force lock, for the article to be sorted which is sliding down the at least one second, inclined transport surface to retain it and prevent it sliding down.

The at least one retaining apparatus, for example the retaining element, can also be manipulated, for example can be switched, displaced and/or lowered, in such a manner that the article to be sorted that is held on the at least one second, inclined transport surface can be released to slide down—due to inclination, gravity or downhill force—thereon.

In graphic and simple terms during manipulation of the at least one retaining apparatus its retaining function is canceled, for example by releasing the form and/or force lock, and the article to be sorted that is held on the at least one second, inclined transport surface is therefore released to slide down—due to inclination, gravity or downhill force—thereon.

Such a manipulatable retaining apparatus or retaining element can be for example a switchable/foldable/collapsible flap, a lowerable bar, or the like.

In particular it can extend parallel to the axis of inclination on the at least one second, inclined transport surface ("horizontal alignment"). It can also extend over the entire related ("horizontal") extension of the at least one second, inclined transport surface ("horizontal over the entire transport surface width").

If the manipulatable at least one retaining apparatus or retaining element is embodied as a flap, it can also take on a slide function.

Such a manipulatable at least one retaining apparatus or retaining element can also be configured as elastic (at least in the outward feed direction) in order to reduce the strain on an article to be sorted (avoiding "hard" impact forces).

In simple and graphic terms at least one manipulatable retaining apparatus or retaining element can be arranged at or on the at least one second, inclined transport surface of the transport element, for example a switchable/foldable/collapsible flap, a lowerable/displaceable bar or the like, which retains, in particular by a form and/or force lock, an article to be sorted that is held on the at least one second, inclined transport surface to prevent it sliding down thereon due to inclination, gravity or downhill force.

In brief or simple terms the article to be sorted that is held on the at least one second, inclined transport surface can be braced against the at least one retaining element, in particular with a form and/or force lock. Unwanted or premature sliding down of an article to be sorted (away from the respective destination/outward feed point) is prevented.

When the at least one retaining apparatus is then manipulated—according to its functionality—for example the retaining element is switched, lowered and/or displaced, the article to be sorted that is held on the at least one second, inclined transport surface is released to slide down—due to inclination, gravity or downhill force—thereon.

The article to be sorted that is held on the transport surface can thus start to slide down the at least one second, inclined transport surface; the outward feed of the article to be sorted from the transport element can be initiated or triggered in a temporally and/or spatially specific and desired manner.

Because the tilt of a transport surface here is "already present/assumed (during transportation of an article to be sorted on the at least one second, inclined transport surface of the transport element)" not just temporarily executed during the outward feed, as with the at least one first transport surface that can be pivoted on both sides or with a (support) tray that is only tilted for the outward feed in a tilt tray conveyor, the downhill force produced by gravity or weight force here acts "constantly" or "perpetually" on the article arranged on the at least one second, inclined transport surface.

An article arranged on the at least one second, inclined transport surface is thus "always" ready or "prepared" for the outward feed.

The manipulatable retaining apparatus (also bracing the article to be sorted that is held on the at least one second, inclined transport surface) is therefore also necessary to prevent premature or unwanted outward feeding of the article (therefrom).

"Only" when the article to be sorted that is held on the at least one second, inclined transport surface is fed outward in a desired manner can the at least one retaining apparatus be manipulated according to its function and the article to be sorted that is held on the at least one second, inclined transport surface therefore be released, thus triggering the outward feeding of the correspondingly "always prepared" article to be sorted that is held on the at least one second, inclined transport surface.

The manipulation of the at least one retaining apparatus or retaining element arranged on the at least one second, inclined transport surface can preferably be performed "from outside", i.e. by an actuator that is not arranged on the transport element or moved therewith, for example by a fixed actuator driving a control element for the at least one retaining apparatus. The transport element can thus be configured passively in this respect and can therefore be cost-effective. This can also increase the outward feed reliability.

The at least one retaining apparatus or retaining element can also be arranged on the at least one second, inclined transport surface at a predefinable distance above a lower or outer edge of the at least one second transport surface thereon. An article to be fed outward, i.e. an article sliding down the at least one second, inclined transport surface, can thus already have a significant speed when the front edge of the article to be fed outward or to slide down moves beyond the lower edge of the at least one second, inclined transport surface.

When two or more of the at least one manipulatable retaining apparatus or retaining element are arranged on the at least one second, inclined transport surface, in particular in each instance horizontally over the entire width of the at least one second, inclined transport surface, two or more articles can be "processed", i.e. they can be conveyed on the at least one second, inclined transport surface and safely and reliably fed outward one after the other in time.

The strain on an article when loading an article on the at least one second, inclined transport surface can also be reduced if the at least one second, inclined transport surface has switchable friction elements.

Regardless of the otherwise permanent or static at least one second, inclined transport surface, provision can also be made for it to be pivoted/inclined (about the axis of inclination).

To (advantageously) assist the outward feeding of an article arranged on the at least one second, inclined transport surface, the at least one second, inclined transport surface can be pivoted downward itself as the outward feed starts, in order to assist the transition of the article to be fed outward into sliding/slipping.

Provision can also be made here for the at least one second, inclined transport surface to completely fold down vertically in a downward direction so the article to be fed outward is fed outward in a downward direction here.

To assist with loading or inward feeding with the transport element, the at least one second, inclined transport surface—because advantageous—can be moved or pivoted more or completely into a horizontal position in or for this (loading) phase. Then or after the at least one second, inclined transport surface has been loaded, it can be inclined or pivoted (again), in particular slowly.

Such pivot movements of the at least one second, inclined transport surface (during loading and/or outward feeding) can be brought about by means of a corresponding manipulation apparatus. This can be initiated "from outside" in a structurally simple manner by means of a cam mechanism.

Cheeks and/or other retaining elements, like those for the at least one first transport element that can be pivoted on both sides, can also be provided for the at least one second, inclined transport element.

Developments for the double stack rocker transport element.

According to one particularly preferred development the transport element has two of the at least one first transport surface that can be pivoted on both sides and two of the at least one second, inclined transport surface.

In simple and graphic terms the transport element has two transport levels (lower and upper transport levels) for articles to be transported, with the two first transport surfaces that can be pivoted on both sides arranged at the upper level (on the left and right or on the left and right side in the transport direction) and the two second, inclined transport levels arranged at the lower level (on the left and right or on the left and right side in the transport direction) (two upper rockers and two lower static transport surfaces).

The two lower second, inclined transport surfaces mean that articles can be unloaded from the upper, e.g. right, side to the left side parallel to the articles on the upper left first transport surface that can be pivoted on both sides.

The unloading sequence to be established for such an unbalanced load must therefore relate only to two articles not four articles, which would not allow any further significant increase in throughput.

Provision can also be made for one of the outer retaining elements to be provided for each of the two first transport surfaces that can be pivoted on both sides and the two second, inclined transport surfaces (therefore a total of four outer retaining elements) and/or for one of the inner retaining elements to be provided for each of the two first transport surfaces that can be pivoted on both sides (therefore a total of two inner retaining elements).

Provision can also be made here for the four outer retaining elements to be closed counter to a spring force by way of a fixed cam mechanism at a point in front of the loading region. Provision then only has to be made to unlock the control element bringing about the closure, for example by means of an unlocking actuator, at the many unloading positions.

If such an unlocking actuator were part of the transport element, the unloading time point could be selected as a function of the article/consignment to reduce the risk of incorrect sorting.

However only one article per side could then be unloaded between loading regions and therefore the capacity to transport a number of articles/consignments on the transport element could not be utilized for one side.

The opening of the respective inner retaining element of the two first transport surfaces that can be pivoted on both sides could be performed (also counter to a spring force) by the pivot movement of the two first transport surfaces that can be pivoted on both sides themselves, which would then however mean a corresponding longer slide path for a possibly second article (on the respective first transport surface that can be pivoted on both sides).

The two first transport surfaces that can be pivoted on both sides and/or the second, inclined transport surfaces are preferably each arranged symmetrically to one another with the transport element.

According to one particularly preferred development the two second, inclined transport surfaces are each inclined by the same angle (same angle size) about the axis of inclination—but—counter to one another. In other words the two second, inclined transport surfaces are inclined by the same angle size but with a different preceding sign about their respective axis of inclination.

The two second transport surfaces that are inclined counter to one another here can join together at a "common" edge.

In simple and graphic terms such two second transport surfaces that are inclined counter to one another can form a "triangular prism" or a part thereof.

The triangular prism at the "common edge" can also be capped, which can be advantageous for an inward feed/insertion arrangement. An, in particular horizontal, stop surface can also be provided at the "common edge" (see also inner retaining element), facilitating the inward feeding of an article "from the side".

As a result, i.e. with the transport element with two such second transport surfaces that are inclined counter to one another, it is possible to increase the sorting throughput of such a sorting installation. It is also possible to load the two second transport surfaces of such a transport element that are inclined counter to one another simultaneously at one position (inward feed point) with two loading stations.

Development of the overall installation/distributing conveyor.

Provision can also be made for an inventive transport element to be coupled to a transport means, for example a traction means, such as a chain, and/or an autonomous vehicle, or to be connected thereto.

Provision can therefore also be made with a distributing conveyor of a sorter of a sorting installation for a number of the inventive transport elements to be connected to one another in an articulated manner, in particular to form an endless chain. The endless chain will thus be able to cover all the outward feed points in the sorting installation.

The description of advantageous embodiments of the invention given above contains numerous features which are set out in the individual subclaims, in some instances in combination. The person skilled in the art will however also expediently consider such features individually and combine them in expedient further combinations.

The attributes, features and advantages of this invention described above, as well as the manner in which they are achieved, will become clearer and more understandable in conjunction with the description which follows of the exemplary embodiments which are described in more detail with reference to the drawings.

However the invention is not restricted to the combination of features set out in the exemplary embodiments, not even in respect of functional features. Thus appropriate features of any exemplary embodiment can also be considered specifically in isolation, being taken from one exemplary embodiment and introduced into a different exemplary embodiment to complete it.

Identical elements or components or those with the same function or structure are shown with the same reference characters in the exemplary embodiments.

BRIEF DESCRIPTION OF THE SEVERAL VIEWS OF THE DRAWING

FIG. 7 shows a transport element for a distributing conveyor of a sorter of a sorting installation according to a further exemplary embodiment, FIG. 8 shows a transport element for a distributing conveyor of a sorter of a sorting installation according to a further exemplary embodiment, FIG. 9 shows a transport element for a distributing conveyor of a sorter of a sorting installation according to a further exemplary embodiment.

DESCRIPTION OF THE INVENTION

Structure of Transport Element 1/"Double Stack Cart"

Figure 1:
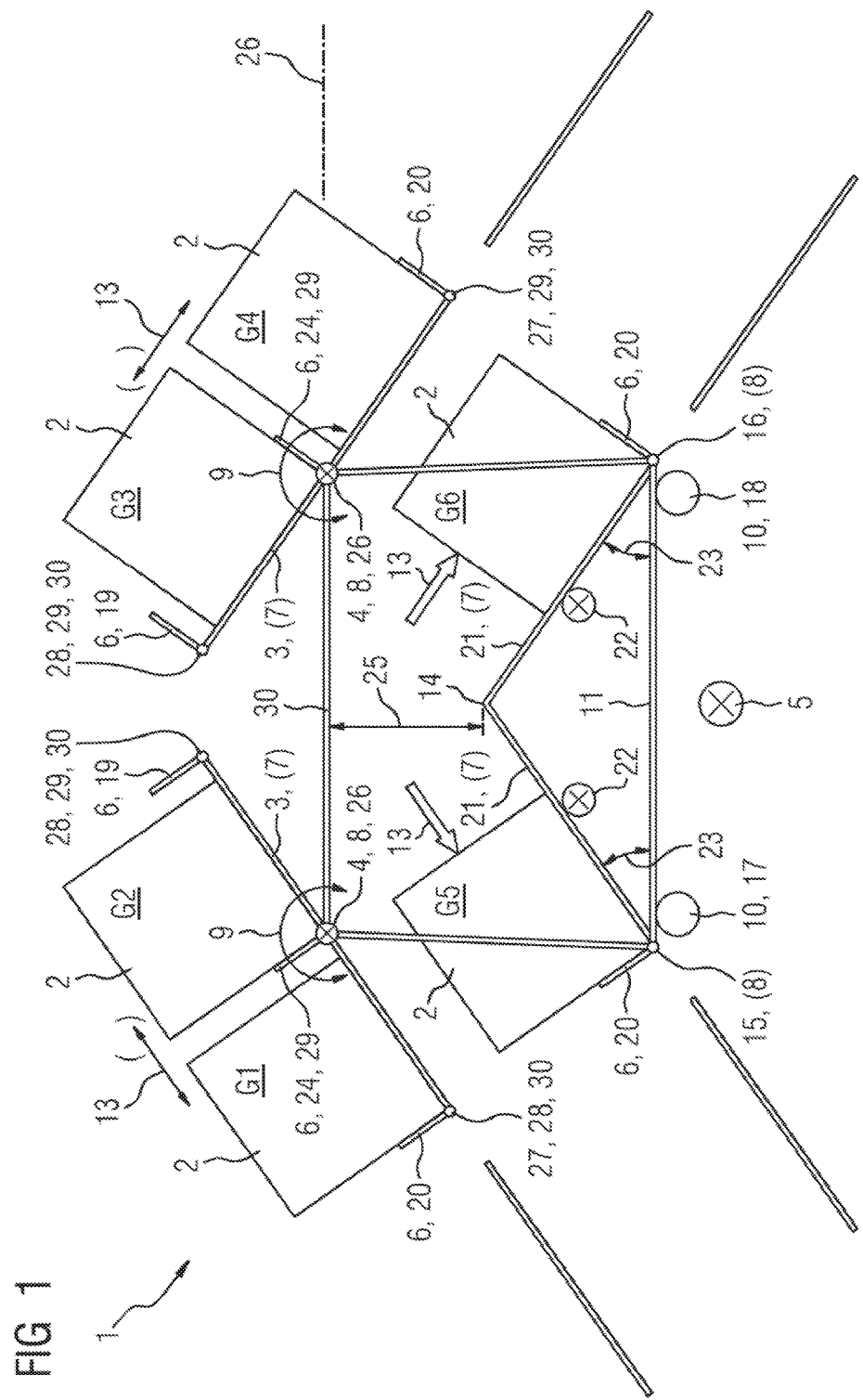
FIG. 1 shows a transport element for a distributing conveyor of a sorter of a sorting installation according to one exemplary embodiment (principle)

FIG. 1 shows a transport element 1 for a distributing conveyor of a sorter of a sorting installation of a sorting system for sorting articles 2, for example packages.

In this distributing conveyor a number of such transport elements 1 according to FIG. 1 are connected to one another in an articulated manner by way of a (traction) chain (not shown) and run—drawn in the transport direction 5 by way of the chain—in a guided manner on longitudinal rails 17, 18 of a rail system 10.

Figure 4:
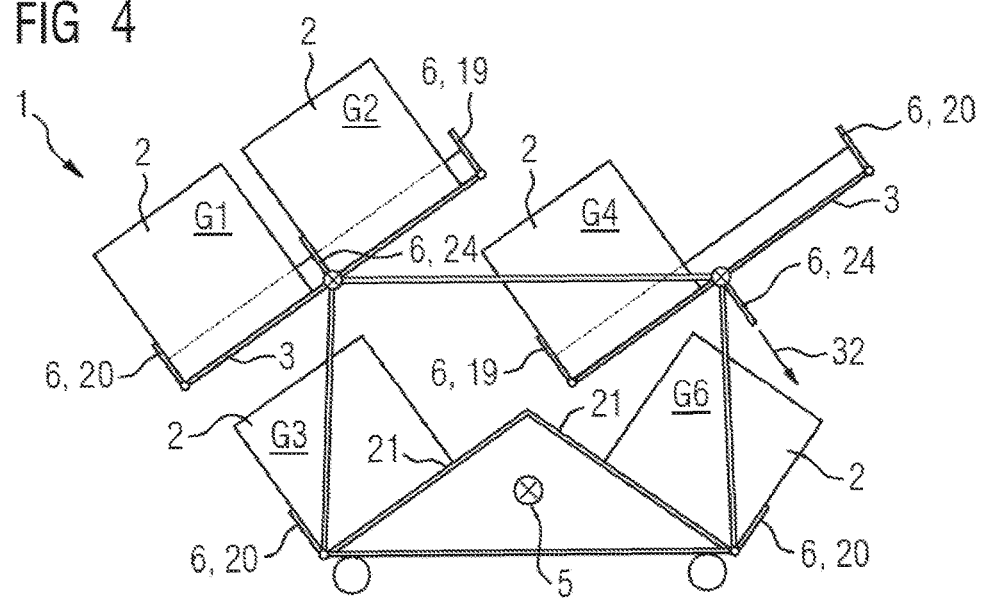
FIG. 4 shows a transport element for a distributing conveyor of a sorter of a sorting installation (internal repositioning during loading) according to one exemplary embodiment (principle)

FIG. 1 shows—by way of example—the transport element 1 in a loaded state (in this instance loaded with six articles: article 1 (G1), article 2 (G2), article 3 (G3), article 4 (G4), article 5 (G5), article 6 (G6)) during transportation to an outward feed or destination point (see also FIG. 4).

The transport element 1—the form of which is similar to a "symmetrical double stack cart"—has (configured as a framework 30) at its "lower" level—the form of which is similar to a "(symmetrical) triangular prism"—two fixed (static) transport surfaces 21 (lower or second, inclined or transport surfaces 21) for holding the article 2 to be sorted, each inclined/tilted counter to one another by the same angle 23 (same angle size), in this instance approx. 35°, about a tilt axis 22 running in the transport direction 5.

The two fixed lower transport surfaces 21 that are inclined by the angle 23 touch here along a common edge 14—forming the "height" of the "triangular prism". The "triangular prism" is closed by a base surface/plate 11, with the two lower transport surfaces 3 arranged along its edges 15, 16 running in the transport direction 5 or in the longitudinal rail direction.

Each of the two inclined lower transport surfaces 3 of such a transport element 1 has a collapsible/foldable outer retaining element 6, 20 configured as a (longitudinal) flap 6, arranged in each instance on the lower edge of a respective lower transport surface 21 (lower flap).

The flaps or outer retaining elements 6 or 20 for the lower transport surfaces 21 are aligned horizontally and extend over the entire width 7 of the respective lower transport surface 21.

Fixed actuators (not shown) drive control elements (also not shown) from "outside", said control elements switching or manipulating the flaps/outer retaining elements 6 or 20.

Each of said flaps/outer retaining elements 6 or 20 on the lower inclined transport surfaces 21 (in the "folded up" state) thus secures an article 2 (in this instance article 5 and article 6) to prevent it sliding down 13 due to downhill force (in sliding direction 13)—with a form and force lock—on the respective lower inclined transport surface 21.

Arranged above 13 the two lower inclined transport surfaces 21 in the transport element 1—at its upper level—(also symmetrically and at the same vertical height 26 in relation to one another) are two transport surfaces 3 that can be pivoted on both sides (upper or first transport surfaces 3 that can be pivoted on both sides) or (upper) rockers 3, i.e. a left and right rocker 2 (in the transport direction 5).

The two upper transport surfaces/rockers 3 or transport surfaces/rockers 3 that can be pivoted on both sides can each be tilted/pivoted by means of an electromechanical actuator 8 about their respective tilt axis 4 in an angle range of approx. +/−60° on both sides, with the respective tilt axis 4 dividing the respective upper transport surface/rocker 3 or transport surface/rocker 3 that can be pivoted on both sides roughly into two approximately equal sub-surfaces.

Each of the two upper transport surfaces/rockers 3 or transport surfaces/rockers 3 that can be pivoted on both sides of the transport element 1 has a collapsible/foldable outer retaining element 6, 20 configured as a (longitudinal) flap 6 and a collapsible/foldable inner retaining element 6, 19, (also) configured as a (longitudinal) flap 6, arranged respectively on the outer 27 or inner edge 28 of a respective upper transport surface/rocker 3 or transport surface/rocker 3 that can be pivoted on both sides.

Said flaps or outer and inner retaining elements 6 or 20/19 for the two upper transport surfaces/rockers 3 or transport surfaces/rockers 3 that can be pivoted on both sides are (like the flaps 6 for the lower inclined transport surfaces 21) aligned horizontally and extend over the entire width 7 of the respective upper transport surface/rocker 3 or transport surface/rocker 3 that can be pivoted on both sides.

Actuators 29 drive control elements 30, which switch or manipulate the flaps/outer or inner retaining elements 6 or 19/20 for the two upper transport surfaces/rockers 3 or transport surfaces/rockers 3 that can be pivoted on both sides.

Each of said flaps/outer or inner retaining elements 6 or 19/20 on the two upper transport surfaces/rockers 3 or transport surfaces/rockers 3 that can be pivoted on both sides (in the "folded up" position) thus secures an article 2 (in this instance article 1 and article 2 or article 3 and article 4) to prevent it sliding down 13 due to downhill force (in sliding direction 13)—with a form and force lock—on the respective upper transport surface/rocker 3 or transport surface/rocker 3 that can be pivoted on both sides in its tilted state.

Each of the upper transport surfaces/rockers 3 or transport surfaces/rockers 3 that can be pivoted on both sides also has a center bar 6 or 24 "that can be lowered (made to disappear) in a downward direction" by means of an actuator 29 and is arranged in the region of the center or the tilt axis 4 on the respective upper transport surface/rocker 3 or transport surface/rocker 3 that can be pivoted on both sides.

Said center bars 24 for the two upper transport surfaces/rockers 3 or transport surfaces/rockers 3 that can be pivoted on both sides are (like the flaps 6 for the lower inclined transport surfaces 21) aligned horizontally and extend over the entire width 7 of the respective upper transport surface/rocker 3 or transport surface/rocker 3 that can be pivoted on both sides.

Each of said center bars 24 on the two upper transport surfaces/rockers 3 or transport surfaces/rockers 3 that can be pivoted on both sides thus divides the respective upper transport surface/rocker 3 or transport surface/rocker 3 that can be pivoted on both sides into two transport spaces (inner and outer transport space) for two articles 2 to be transported and (in the "raised" state) thus secures an article 2 (in this instance article 2 or article 3) to prevent it sliding around or "to and fro" 13 due to downhill force (in sliding direction 13)—with a form and force lock—on the respective upper transport surface/rocker 3 or transport surface/rocker 3 that can be pivoted on both sides in its tilted state.

Loading/Reloading, Transportation and Unloading of the Transport Element 1/"Double Stack Cart" (FIGS. 2 to 6)

Figure 2:
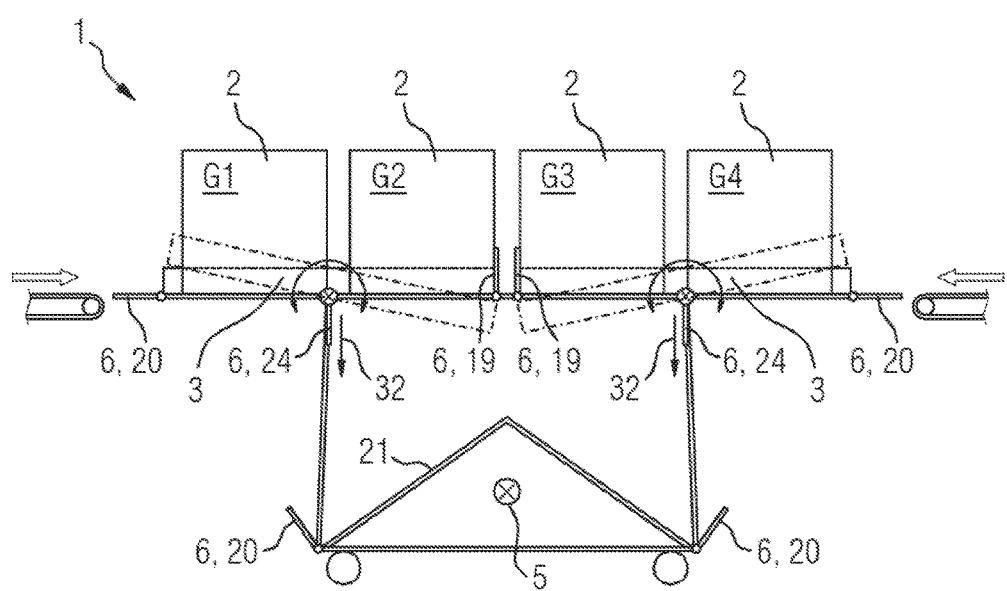
FIG. 2 shows a transport element for a distributing conveyor of a sorter of a sorting installation during loading according to one exemplary embodiment (principle)
Figure 3:
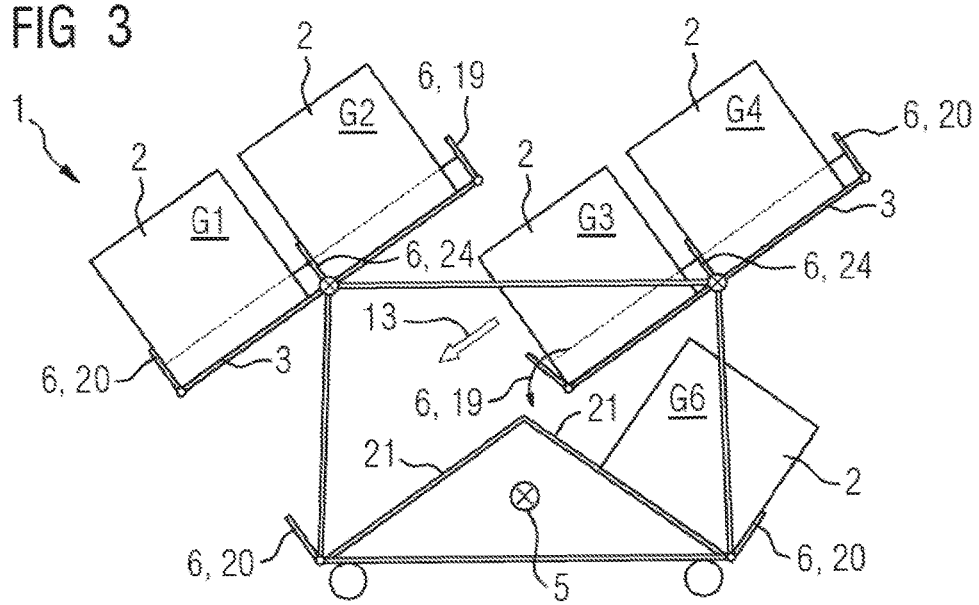
FIG. 3 shows a transport element for a distributing conveyor of a sorter of a sorting installation during loading (internal repositioning during loading) according to one exemplary embodiment (principle)

Loading/Feeding Inward and Reloading/Repositioning (FIGS. 2 to 4)

While FIG. 1 shows the transport element 1 loaded with six articles 2 during transportation to an outward feed point or destination point (see also FIG. 4), FIGS. 2 to 4 show loading including the internal repositioning of articles within the transport surfaces 3 and 21 of the transport element 1.

The loading of the transport element 3 at the inward feed or loading point takes place on both sides of the transport element and solely by way of the upper level of the transport element 1 or its two upper transport surfaces 3 or rockers 3 that can be pivoted on both sides.

When the transport element 1—initially still without load—is located at the inward feed or loading point, the two upper transport surfaces 3 or rockers 3 that can be pivoted on both sides are initially in the horizontal or tilted slightly (approx. 10°) inward position (shown).

The two outer retaining elements 20 on the two upper transport surfaces 3 or rockers 3 that can be pivoted on both sides are folded away, while the two outer retaining elements 20 on the two lower inclined transport surfaces 21 are folded up. The two center bars 24 on the two upper transport surfaces 3 or rockers 3 that can be pivoted on both sides are moved away "in a downward direction" 32. The two inner retaining elements 19 on the two upper transport surfaces 3 or rockers 3 that can be pivoted on both sides are also folded up.

As shown in FIG. 2, the two "inner" articles 2, i.e. article 2 and article 3, (on both sides of the transport element 1) are initially pushed to the respective upper right or left transport surface 3 or rocker 3 that can be pivoted on both sides or slide—when the upper right or left transport surface 3 or rocker 3 that can be pivoted on both sides is in the tilted inward position—due to or with the assistance of downhill force—onto the respective upper right or left transport surface 3 or rocker 3 that can be pivoted on both sides until they come up against the respective (folded up) inner retaining element 19.

When the transport element 1 is thus loaded with these two "inner" articles 2 (article 2 and article 3), the two center bars 24 of the two upper transport surfaces 3 or rockers 3 that can be pivoted on both sides are moved upward and can thus secure the two "inner" articles 2 (article 2 and article 3) to prevent them sliding back (when the rockers are in a counter tilted position (see also repositioning and transportation)).

The outer articles 2 (article 1 and article 4) are then pushed onto the respective upper right or left transport surface 3 or rocker 3 that can be pivoted on both sides or slide—when the upper right and left transport surface 3 or rocker 3 that can be pivoted on both sides is in the tilted inward position—due to/with the assistance of downhill force—onto the respective right or left transport surface 3 or rocker 3 that can be pivoted on both sides until they come up against the respective (raised) center bar 24 (preventing sliding).

FIG. 3 (and FIG. 4) show(s) the internal repositioning of the ("inner") articles 2, i.e. article 2 and article 3, from the upper level of the transport element 2 or the two upper transport surfaces 3 or rockers 3 that can be pivoted on both sides to the two lower inclined transport surfaces 21.

To this end, as shown in FIG. 3, one of the two upper transport surfaces 3 or rockers 3 that can be pivoted on both sides (here by way of example the right upper transport surface 3 or rocker 3 that can be pivoted on both sides) is tilted inward, until its tilt angle/angle position corresponds to the corresponding lower inclined transport surface 21 (on the respective "other" side of the transport element 1) and their transport surfaces 3 and 21 are approximately extensions of one another.

As also shown in FIG. 3, the inner retaining element 19 of the upper, right transport surface 3 or rocker 3 that can be pivoted on both sides is folded away, as a result of which the inner article, i.e. article 3, slides—due to/assisted by downhill force—(from the upper, right transport surface 3 or rocker 3 that can be pivoted on both sides) to the lower left inclined transport surface 21—to the raised outer retaining element 20 there (see FIG. 4). In this process the inner retaining element 19 of the upper, right transport surface 3 or rocker 3 that can be pivoted on both sides takes on a bridge function/slide function between the upper, right transport surface 3 or rocker 3 that can be pivoted on both sides and the lower left inclined transport surface 21.

The inner retaining element 19 of the upper, right transport surface 3 or rocker 3 that can be pivoted on both sides is then folded up again.

When the center bar 24 of the upper, right transport surface 3 or rocker 3 that can be pivoted on both sides is moved away in a downward direction, the outer article 2, i.e. article 4, slides on the upper, right transport surface 3 or rocker 3 that can be pivoted on both sides from the outer to the inner position, until it comes up against the folded up inner retaining element 19 of the upper, right transport surface 3 or rocker 3 that can be pivoted on both sides there.

The center bar 24 of the upper, right transport surface 3 or rocker 3 that can be pivoted on both sides is raised again and can thus now secure the "inner" article 4 (article 4) (when the rocker 3 is back in the countertilted position) to prevent it sliding back.

As when the transport element 1 is in the unloaded state, the upper right transport surface 3 or rocker 3 that can be pivoted on both sides is now tilted back into the horizontal or tilted slightly (approx. 10°) inward position (see FIG. 2), in which a further "outer" article, i.e. a new article 4—when the outer retaining element 20 of the upper right transport surface 3 or rocker 3 that can be pivoted on both sides is folded away—is pushed onto the upper right transport surface 3 or rocker 3 that can be pivoted on both sides or slides (due to/assisted by downhill force) onto the upper right transport surface 3 or rocker 3 that can be pivoted on both sides up to the raised center bar 24 (preventing sliding).

The outer retaining element 20 of the upper right transport surface 3 or rocker 3 that can be pivoted on both sides is then folded up again.

In the same way as the inner (upper right) article, i.e. article 3, is repositioned from the upper level right into the lower level, on the left of the transport element 1, and the upper level is reloaded on the right with a new outer (upper right) article, i.e. new article 4, the inner (upper left) article, i.e. article 2, is repositioned from the upper level left into the lower level, on the right of the transport element 1 and the upper level is reloaded on the left with a new outer (upper left) article.

Figure 5:
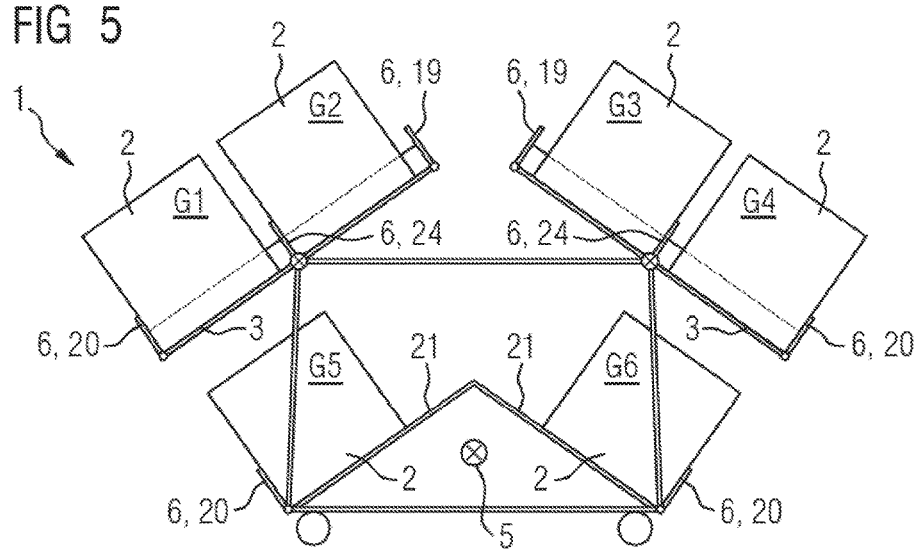
FIG. 5 shows a transport element for a distributing installation during transportation according to one exemplary embodiment (principle)

Transportation (FIG. 5)

FIG. 5 shows the transport element 1 loaded with six articles 2, i.e. article 1 to article 6, during transportation to an outward feed or destination point (see also FIG. 1).

To this end the two upper transport surfaces 3 or rockers 3 that can be pivoted on both sides are tilted outward, with the two upper transport surfaces 3 or rockers 3 that can be pivoted on both sides assuming a parallel angle position (in this instance by way of example 35°) corresponding to the two lower inclined transport surfaces 21.

The articles 2, i.e. article 1 to article 6, rest against their respective (folded up) outer retaining elements 20 or (raised) center bars 24 due to/assisted by downhill force.

Figure 6:
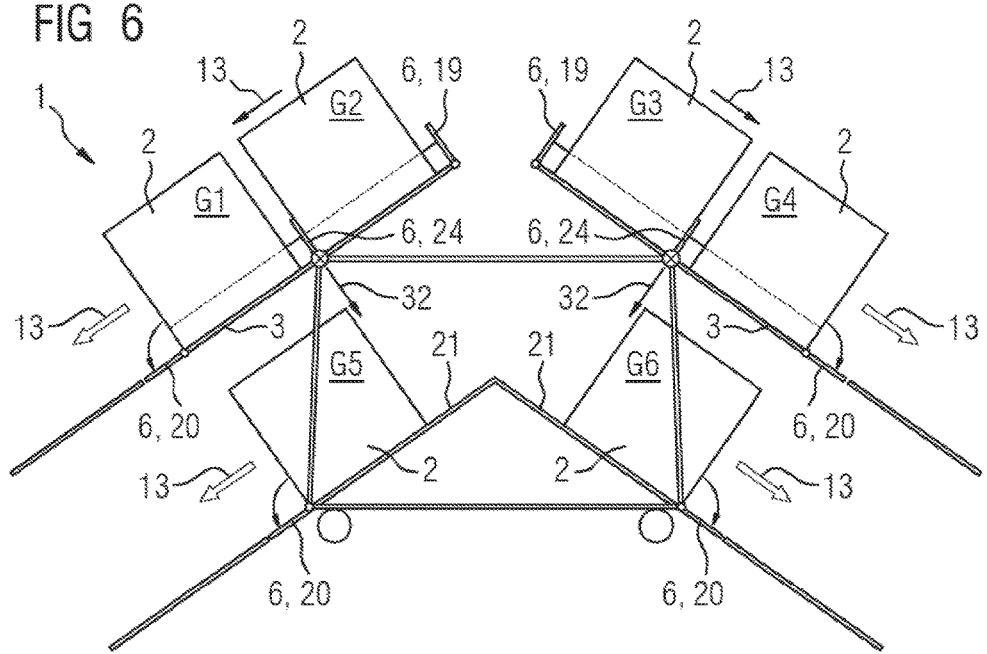
FIG. 6 shows a transport element for a distributing conveyor of a sorter of a sorting installation during unloading according to one exemplary embodiment (principle)

Outward Feed/Unloading (FIG. 6)

FIG. 6 shows the unloading or outward feeding of articles 2 from the transport element 1 loaded with six articles, i.e. article 1 to article 6, at an outward feed or destination point.

When the transport element 1, which is in the transport position in respect of the two upper transport surfaces/rockers 3 that can be pivoted on both sides and the two lower inclined transport surfaces 21 (see FIG. 5, upper rockers 3 each tilted outward by approx. 35°, all flaps 6 or outer retaining elements 20, inner retaining elements 19 and center bars 24 in the retaining position), reaches the destination/outward feed point, the outer retaining elements 20 on the two upper transport surfaces/rockers 3 that can be pivoted on both sides and/or the two lower inclined transport surfaces 21 are folded away (in an outward direction) as shown in FIG. 6.

The articles 2 (article 1, article 4, article 5 and article 6) which were secured formerly or during transportation by the respective outer retaining elements 20/19 to prevent them sliding down 13 due to downhill force (in sliding direction 13)—with a form and force lock—are thus released and slide down in sliding direction 13 relative to the transport element 1—due to/assisted by downhill force—from the respective transport surfaces 3 and 21.

If the articles 2 (article 2 and article 3), which are still braced against the center bars 24 and thus secured to prevent them from sliding due to downhill force, are to be unloaded/fed outward on the two upper transport surfaces 3 or rockers 3 that can be pivoted on both sides, the two center bars 24 are also "moved away" in a downward direction, thus releasing the remaining two articles (article 2 and article 3). Therefore these also slide down in sliding direction 13 relative to the transport element 1—due to/assisted by downhill force—from the respective upper transport surfaces 3 or rockers 3 that can be pivoted on both sides.

To reduce the outward feed speed of the "inner" articles 2 on the two upper transport surfaces 3 or rockers 3 that can be pivoted on both sides and to allow approximately identical outward feed conditions for an "inner" and "outer" article 2 on an upper transport surface 3 or rocker 3 that can be pivoted on both sides, the outer retaining elements 20 on the two upper transport surfaces/rockers 3 that can be pivoted on both sides can be folded up again temporarily, being folded away again when the "inner" articles 2 slide up to them (cascaded outward feed).

If the downhill force due to gravity or weight therefore acts "constantly" or "perpetually" on the articles 2 arranged on the transport element 1 with the two tilted, upper transport surfaces 3/rockers 3 that can be pivoted on both sides and the lower transport surfaces 21 that are inclined counter to one another, said articles 2 being secured by the respective flaps 6 or outer retaining elements 20 and center bars 24 (to prevent unwanted sliding down 13), i.e. the articles 2 arranged on the two tilted, upper transport surfaces 3/rockers 3 that can be pivoted on both sides and the lower transport surfaces 21 that are inclined counter to one another are "always" ready or "prepared" for outward feeding, the respective article is only released by the collapsing and moving "downward" 32 of a flap 6 or an outer retaining element 20 and a center bar 24 (at the destination point), whereupon it slides down from the transport surface 3.

There is therefore no need here for a "separate" tilt movement in the transport element 1 to "prepare" the article beforehand for sliding down.

Further Exemplary Transport Elements 1/"Double Stack Carts"

FIG. 7, FIG. 8 and FIG. 9 each show a further transport element 1 (otherwise in principle configured largely in the same manner as the transport element 1 in FIG. 1 to FIG. 6 ("upper rocker function" (with one or two rockers) and with two lower inclined static transport surfaces). FIG. 7 shows a transport element 1 with two upper transport surfaces 3 or rockers 3 that can be pivoted on both sides and two lower inclined transport surfaces 21.

As shown in FIG. 7, the two upper transport surfaces 3 or rockers 3 that can be pivoted on both sides each have a particular tilt/pivot mechanism, which brings about a particular pivot/tilt kinematic 31 with controlled flap movement for the two upper transport surfaces 3 or rockers 3 that can be pivoted on both sides or the flaps 6 (19, 20, 24) there.

FIG. 8 shows a transport element 1 with a central upper transport surface 3 or rocker 3 that can be pivoted on both sides as well as two lower inclined transport surfaces 21.

As shown in FIG. 8, the central upper transport surface 3 or rocker 3 that can be pivoted on both sides is arranged (centrally/in the middle) above the two lower inclined transport surfaces 21 by means of a rod-type bar 33.

The rod-type bar 33 is connected in both an articulated and rotatable manner (articulation 34) to the central upper transport surface 3 or rocker 3 that can be pivoted on both sides as well as (articulation 35) to the common edge 14 of the two lower inclined transport surfaces 21.

Both degrees of freedom can be positively coupled—for example by means of a belt.

FIG. 9 shows a transport element 1 also with a central upper transport surface 3 or rocker 3 that can be pivoted on both sides as well as two lower inclined transport surfaces 21.

As shown in FIG. 9, the central upper transport surface 3 or rocker 3 that can be pivoted on both sides here is connected directly in an articulated/rotatable manner (tilt axis 4) to the common edge 14 of the two lower inclined transport surfaces 21.

Although the invention has been illustrated and described in detail using the preferred exemplary embodiments, the invention is not restricted by the disclosed examples and other variations can be derived therefrom by the person skilled in the art without departing from the scope of protection of the invention.

The invention claimed is:

1. A transport element for a distributing conveyor of a sorter of a sorting installation of a sorting system for sorting articles, the transport element comprising:
   at least one first transport surface being pivotable on both sides about an axis extending in a transport direction of the transport element for receiving at least one article to be sorted;
   at least one second transport surface being inclined about an axis extending in said transport direction of the transport element for receiving at least one article to be sorted;
   said at least one first transport surface pivotable on both sides being disposed above said at least one second inclined transport surface; and
      said at least one first transport surface being pivotable on both sides is two first transport surfaces being pivotable on both sides and being disposed next to one another in said transport direction; or
      said at least one second inclined transport surface is two second inclined transport surfaces being inclined counter to one another by an equal angle size about said axis in said transport direction.

2. The transport element according to claim 1, wherein said two first transport surfaces being pivotable on both sides are disposed next to one another in said transport direction at an approximately equal vertical height.

3. A transport element for a distributing conveyor of a sorter of a sorting installation of a sorting system for sorting articles, the transport element comprising:
   at least one first transport surface being pivotable on both sides about an axis extending in a transport direction of the transport element for receiving at least one article to be sorted;
   said at least one first transport surface being pivotable on both sides having at least one retaining apparatus for retaining an article to be sorted being received on said at least one first transport surface being pivotable on both sides to prevent it from sliding down on said at least one first transport surface being pivotable on both sides;
   said at least one retaining apparatus being configured to be manipulated to release the article to be sorted being received on said at least one first transport surface being pivotable on both sides to slide down on said at least one first transport surface being pivotable on both sides;
   at least one second transport surface being inclined statically about a predefinable angle of inclination for receiving at least one article to be sorted; and
   said at least one first transport surface pivotable on both sides being disposed above said at least one second inclined transport surface.

4. The transport element according to claim 3, wherein said at least one retaining apparatus is at least one of:
   a retaining element or a flap configured to be unlocked at an outward feed point; or
   a lowerable retaining element; or
   an at least partially elastic retaining element; or
   a retaining element extending over an entire width of at least one of said at least one first transport surface being pivotable on both sides or said at least one second inclined transport surface.

5. A transport element for a distributing conveyor of a sorter of a sorting installation of a sorting system for sorting articles, the transport element comprising:
   at least one first transport surface being pivotable on both sides about an axis extending in a transport direction of the transport element for receiving at least one article to be sorted;
   at least one second transport surface being inclined statically about a predefinable angle of inclination for receiving at least one article to be sorted;
   said at least one first transport surface pivotable on both sides being disposed above said at least one second inclined transport surface
   said at least one second inclined transport surface having at least one retaining apparatus for retaining an article to be sorted being received on said at least one second inclined transport surface to prevent it from sliding down on said at least one second inclined transport surface; and
   said at least one retaining apparatus being configured to be manipulated to release the article to be sorted being received on said at least one second inclined transport surface to slide down on said at least one second inclined transport surface.

6. The transport element according to claim 5, wherein said at least one first transport surface being pivotable on both sides being positioned by pivoting to a pivot position relative to said at least one second inclined transport surface, to permit an article to be transported to be transferred from said at least one first transport surface being pivotable on both sides, at least subject to an influence of gravity, to said at least one second inclined transport surface.

7. The transport element according to claim 5, wherein said at least one retaining apparatus is at least one of:
   a retaining element or a flap configured to be unlocked at an outward feed point; or
   a lowerable retaining element; or
   an at least partially elastic retaining element; or
   a retaining element extending over an entire width of at least one of said at least one first transport surface being pivotable on both sides or said at least one second inclined transport surface.

8. The transport element according to claim 5, wherein at least one of said at least one first transport surface being pivotable on both sides or said at least one second inclined transport surface is configured at least partially as a flat or a free-form surface.

9. The transport element according to claim 5, wherein said axis about which said at least one first transport surface is pivotable is a common pivot axis about which said at least one first transport surface being pivotable on both sides is pivotable in both pivot directions.

10. The transport element according to claim 5, wherein at least one of:
    said at least one first transport surface being pivotable on both sides is two first transport surfaces being pivotable on both sides and being disposed next to one another in said transport direction; or
    said at least one second inclined transport surface is two second inclined transport surfaces being inclined counter to one another by an equal angle size about said axis in said transport direction.

* * * * *